(12) United States Patent
Dan-Jumbo et al.

(10) Patent No.: US 9,393,651 B2
(45) Date of Patent: Jul. 19, 2016

(54) BONDED PATCH HAVING MULTIPLE ZONES OF FRACTURE TOUGHNESS

(71) Applicant: The Boeing Company, Chicago, IL (US)

(72) Inventors: Eugene A. Dan-Jumbo, Bothell, WA (US); Russell L. Keller, Maple Valley, WA (US); Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 475 days.

(21) Appl. No.: 13/945,475

(22) Filed: Jul. 18, 2013

(65) Prior Publication Data

US 2014/0020221 A1  Jan. 23, 2014

Related U.S. Application Data

(60) Division of application No. 12/706,799, filed on Feb. 17, 2010, now Pat. No. 8,524,356, which is a continuation-in-part of application No. 12/400,475, filed on Mar. 9, 2009, now Pat. No. 8,409,384, and a continuation-in-part of application No. 12/400,561, filed on Mar. 9, 2009, now Pat. No. 8,540,909, and a continuation-in-part of application No. 12/400,519, filed on Mar. 9, 2009, now Pat. No. 8,449,703.

(51) Int. Cl.
*B23P 19/04* (2006.01)
*B29C 73/10* (2006.01)
*B29L 31/30* (2006.01)

(52) U.S. Cl.
CPC ............... *B23P 19/04* (2013.01); *B29C 73/10* (2013.01); *B29L 2031/3076* (2013.01); *Y10T 29/49764* (2015.01); *Y10T 428/20* (2015.01); *Y10T 428/24942* (2015.01)

(58) Field of Classification Search
CPC .................................. B23P 19/04; B29C 73/10
See application file for complete search history.

(56) References Cited

U.S. PATENT DOCUMENTS

| | | |
|---|---|---|
| 3,995,080 A | 11/1976 | Cogburn et al. |
| 4,352,707 A | 10/1982 | Wengler et al. |
| 4,497,404 A | 2/1985 | Lowrance |
| 4,588,626 A | 5/1986 | Cologna et al. |
| 4,808,253 A | 2/1989 | Mimbs |

(Continued)

FOREIGN PATENT DOCUMENTS

| | | |
|---|---|---|
| EP | 1775445 A2 | 4/2007 |
| EP | 1972429 A2 | 9/2008 |

(Continued)

OTHER PUBLICATIONS

Notice of Allowance, dated Jul. 9, 2014, regarding U.S. Appl. No. 13/902,816, 12 pages.

(Continued)

*Primary Examiner* — Prashant J Khatri
(74) *Attorney, Agent, or Firm* — Yee & Associates, P.C.

(57) ABSTRACT

A composite laminate patch for reworking an inconsistent area in a structure has inner and outer control regions possessing differing interlaminar fracture toughnesses for controlling the advance of a disbond in the patch. One or more separation zones in the patch between the control regions aids in diffusing the fracture energy of the disbond as the disbond advances from the inner region to the outer region.

3 Claims, 9 Drawing Sheets

(56) References Cited

U.S. PATENT DOCUMENTS

| | | | |
|---|---|---|---|
| 4,818,584 A * | 4/1989 | Eisenmann | B32B 7/14 |
| | | | 244/123.3 |
| 4,820,564 A | 4/1989 | Cologna et al. | |
| 4,824,500 A | 4/1989 | White et al. | |
| 4,858,853 A | 8/1989 | Westerman et al. | |
| 4,912,594 A | 3/1990 | Bannink et al. | |
| 4,916,880 A | 4/1990 | Westerman, Jr. | |
| 4,961,799 A | 10/1990 | Cologna et al. | |
| 4,967,799 A | 11/1990 | Bradshaw et al. | |
| 4,978,404 A | 12/1990 | Westerman, Jr. | |
| 5,023,987 A | 6/1991 | Wuepper et al. | |
| 5,034,254 A | 7/1991 | Cologna et al. | |
| 5,190,611 A | 3/1993 | Cologna et al. | |
| 5,207,541 A | 5/1993 | Westerman et al. | |
| 5,214,307 A | 5/1993 | Davis | |
| 5,232,962 A | 8/1993 | Dershem et al. | |
| 5,344,515 A | 9/1994 | Chenock, Jr. | |
| 5,492,466 A | 2/1996 | Frailey | |
| 5,601,676 A | 2/1997 | Zimmerman et al. | |
| 5,618,606 A | 4/1997 | Sherrick et al. | |
| 5,620,768 A | 4/1997 | Hoffmann, Sr. | |
| 5,626,934 A | 5/1997 | Brewer | |
| 5,709,469 A | 1/1998 | White et al. | |
| 5,732,743 A | 3/1998 | Livesay | |
| 5,868,886 A | 2/1999 | Alston et al. | |
| 5,882,756 A | 3/1999 | Alston et al. | |
| 5,993,934 A | 11/1999 | Reese et al. | |
| 6,149,749 A | 11/2000 | McBroom | |
| 6,206,067 B1 | 3/2001 | Kociemba et al. | |
| 6,265,333 B1 | 7/2001 | Dzenis et al. | |
| 6,468,372 B2 | 10/2002 | Kociemba et al. | |
| 6,472,758 B1 | 10/2002 | Glenn et al. | |
| 6,656,299 B1 | 12/2003 | Grosskrueger et al. | |
| 6,680,099 B1 | 1/2004 | Brewer | |
| 6,758,924 B1 | 7/2004 | Guijt | |
| 6,761,783 B2 | 7/2004 | Keller et al. | |
| 7,325,771 B2 | 2/2008 | Stulc et al. | |
| 7,398,698 B2 | 7/2008 | Griess et al. | |
| 7,404,474 B2 | 7/2008 | Yamaki et al. | |
| 7,628,879 B2 | 12/2009 | Ackerman | |
| 7,935,205 B2 | 5/2011 | Bogue et al. | |
| 8,263,212 B2 | 9/2012 | Care | |
| 8,409,384 B2 | 4/2013 | Dan-Jumbo et al. | |
| 8,449,703 B2 | 5/2013 | Dan-Jumbo et al. | |
| 8,524,356 B1 | 9/2013 | Dan-Jumbo et al. | |
| 8,540,909 B2 | 9/2013 | Dan-Jumbo et al. | |
| 8,617,694 B1 | 12/2013 | Dan-Jumbo et al. | |
| 8,802,213 B2 | 8/2014 | Dan-Jumbo et al. | |
| 8,828,515 B2 | 9/2014 | Dan-Jumbo et al. | |
| 2001/0008161 A1 | 7/2001 | Kociemba et al. | |
| 2003/0075259 A1 | 4/2003 | Graham | |
| 2003/0188821 A1 | 10/2003 | Keller et al. | |
| 2005/0022923 A1 | 2/2005 | Korchnak et al. | |
| 2005/0053787 A1 | 3/2005 | Yamasaki et al. | |
| 2006/0011435 A1 | 1/2006 | Yamaki et al. | |
| 2006/0029807 A1 | 2/2006 | Peck | |
| 2006/0060705 A1 | 3/2006 | Stulc et al. | |
| 2006/0198980 A1 | 9/2006 | Westerdahl | |
| 2006/0243860 A1 | 11/2006 | Kismarton | |
| 2007/0095457 A1 | 5/2007 | Keller et al. | |
| 2007/0100582 A1 | 5/2007 | Griess et al. | |
| 2007/0289692 A1 | 12/2007 | Bogue et al. | |
| 2009/0053406 A1 | 2/2009 | Ackerman | |
| 2010/0047541 A1 | 2/2010 | Care | |
| 2010/0227105 A1 | 9/2010 | Dan-Jumbo et al. | |
| 2010/0227106 A1 | 9/2010 | Dan-Jumbo et al. | |
| 2010/0227117 A1 | 9/2010 | Dan-Jumbo et al. | |
| 2010/0233424 A1 | 9/2010 | Dan-Jumbo et al. | |
| 2013/0337214 A1 | 12/2013 | Dan-Jumbo et al. | |
| 2014/0076481 A1 | 3/2014 | Dan-Jumbo et al. | |
| 2014/0238579 A1 | 8/2014 | Dan-Jumbo | |

FOREIGN PATENT DOCUMENTS

| | | |
|---|---|---|
| EP | 2055466 A2 | 5/2009 |
| WO | WO2009026442 A1 | 2/2009 |
| WO | WO2010104676 A1 | 9/2010 |
| WO | WO2010104741 A1 | 9/2010 |
| WO | WO2010104745 A1 | 9/2010 |
| WO | WO2010104746 A1 | 9/2010 |

OTHER PUBLICATIONS

State Intellectual Office of PRC Notification of Third Office Action and English Translation, issued Jul. 30, 2015, regarding Application No. 201080007776.6, 6 pages.

Office Action, dated May 23, 2013, regarding U.S. Appl. No. 12/903,489, 15 pages.

Dan-Jumbo et al., "Predictable Bonded Rework of Composite Structures Using Tailored Patches," U.S. Appl. No. 13/902,816 and Preliminary Amendment, filing date May 26, 2013, 76 pages.

Dan-Jumbo et al., "Tapered Patch for Predictable Bonded Rework of Composite Structures," U.S. Appl. No. 13/902,855 and Preliminary Amendment, filing date May 27, 2013, 56 pages.

Final Office Action, dated Mar. 20, 2014, regarding U.S. Appl. No. 13/902,816, 7 pages.

Office Action, dated Jan. 8, 2014, regarding U.S. Appl. No. 13/902,855, 35 pages.

International Search Report and Written Opinion, dated May 27, 2015, regarding Application No. PCT/US2015/012897, 10 pages.

Office Action, dated Nov. 7, 2013, regarding U.S. Appl. No. 13/902,816, 26 pages.

Office Action, dated Jan. 5, 2012, regarding U.S. Appl. No. 12/400,519, 21 pages.

Final Office Action, dated Jun. 7, 2012, regarding U.S. Appl. No. 12/400,519, 14 pages.

Notice of Allowance, dated Oct. 18, 2012, regarding U.S. Appl. No. 12/400,519, 20 pages.

International Search Report, dated Jun. 25, 2010, regarding Application No. PCT/US2010/025181 (WO2010104676), 3 pages.

International Search Report, dated May 21, 2010, regarding Application No. PCT/US2010/026229 (WO2010104741), 3 pages.

International Search Report, dated Jun. 29, 2010, regarding Application No. PCT/US2010/026252 (WO2010104745), 3 pages.

International Search Report, dated Jun. 29, 2010, regarding Application No. PCT/US2010/026256 (WO2010104746), 7 pages.

Baker, "Repair Techniques for Composite Structures," In: Composite Materials in Aircraft Structures, Middleton (Ed.), Longman, Jan. 1, 1990, pp. 207-227.

Berthelot, "Effect of the Stacking Sequence on Mat and Cloth Reinforcement Materials," In: Composite Materials: Mechanical Behavior and Structural Analysis (Cole, Trans.), Springer Publishing, New York, 1998, pp. 312-345.

Chang et al., "Properties and failure mechanisms of z-pinned laminates in monotonic and cyclic tension," Composites Part A: Applied Science and Manufacturing, vol. 37, No. 10, Oct. 2006, pp. 1501-1513.

Chang, "A Study on Fracture Toughness of Advanced Structural Composites," Naval Air Development Center Report No. EW-4-73, Jul. 1973, 113 pages.

Dan-Jumbo et al., "Bonded Patch Having Multiple Zones of Fracture Toughness," U.S. Appl. No. 12/706,799, filed Feb. 17, 2010, 47 pages.

Dan-Jumbo et al., "Discretely Tailored Multi-Zone Bondline for Fail-Safe Structural Repair," U.S. Appl. No. 12/903,489, filed Oct. 13, 2010, 43 pages.

Gacoin et al., "Comparison between experimental and numerical study of the adhesively bonded scarf joint and double scarf joint: Influence of internal singularity created by geometry of the double scarf joint on the damage evolution," International Journal of Adhesion and Adhesives, vol. 29, No. 5, Jul. 2009, pp. 572-579.

Harman et al., "Improved design methods for scarf repairs to highly strained composite aircraft structure," Composite Structures, vol. 75, No. 1-4, Sep. 2006, pp. 132-144.

(56) References Cited

OTHER PUBLICATIONS

Kan et al., "Advanced Certification Methodology for Composite Structures," U.S. Department of Transportation Federal Aviation Administration Final Report No. DOT/FAA/AR-96/111, Apr. 1997, 167 pages.
Kelly, "Composite Structure Repair," AGARD Report No. 716, Feb. 1984, 26 pages.
Komoroski et al., "Stacking Sequence Effects and Delamination Growth in Graphite/Epoxy Laminates Under Compression-Dominated Fatigue Loading," In: Composite Materials: Fatigue and Fracture—Fifth Volume, Martin (Ed.), ASTM International, Oct. 1995, pp. 249-267.
Mouritz, "Review of z-pinned composite laminates," Composites Part A: Applied Science and Manufacturing, vol. 38, No. 12, Dec. 2007, pp. 2383-2397.
Prieto, "Modeling and analysis of crack turning on aeronautical structures," Doctoral Thesis, Universitat Politecnica de Catalunya, Apr. 2007, pp. 83-106.
Seng, "Laminate Design," In: Handbook of Composites, Second Edition, Peters (Ed.), Chapman & Hall, London, 1998, pp. 686-695.
Tomblin et al., "Assessment of Industry Practices for Aircraft Bonded Joints and Structures," U.S. Department of Transportation Federal Aviation Administration Final Report No. DOT/FAA/AR-05/13, Jul. 2005, 245 pages.
Tomblin et al., "Bonded Repair of Aircraft Composite Sandwich Structures," U.S. Department of Transportation Federal Aviation Administration Final Report No. DOT/FAA/AR-03174, Feb. 2004, 121 pages.
Wang et al., "Optimum Shapes for Minimising Bond Stress in Scarf Repairs," Proceedings of the 5th Australasian Congress on Applied Mechanics (ACAM2007), Dec. 2007, 6 pages.
"Damage-tolerance and fatigue evaluation of structure," U.S. Department of Transporation Federal Aviation Regulation 14 CFR 25.571, Apr. 1998, 3 pages. Accessed May 29, 2012 from http://www.flightsimaviation.com/data/FARS/part_25-571.html.
Office Action, dated Dec. 22, 2011, regarding U.S. Appl. No. 12/400,475, 15 pages.
Final Office Action, dated Jun. 7, 2012, regarding U.S. Appl. No. 12/400,475, 14 pages.
Notice of Allowance, dated Oct. 29, 2012, regarding U.S. Appl. No. 12/400,475, 20 pages.
Office Action dated Jan. 2, 2013, regarding U.S. Appl. No. 12/706,799, 33 pages.
Office Action, dated Jul. 14, 2011, regarding U.S. Appl. No. 12/401,541, 13 pages.
Final Office Action, dated Dec. 16, 2011, regarding U.S. Appl. No. 12/401,541, 10 pages.
Office Action, dated Jul. 24, 2012, regarding U.S. Appl. No. 12/401,541, 18 pages.
Final Office Action, dated Dec. 14, 2012, regarding U.S. Appl. No. 12/401,541, 13 pages.
Office Action, dated Feb. 1, 2012, regarding U.S. Appl. No. 12/400,560, 13 pages.
Final Office Action, dated Jul. 5, 2012, regarding U.S. Appl. No. 12/400,561, 15 pages.
Notice of Allowance, dated Feb. 22, 2013, regarding U.S. Appl. No. 12/400,561, 19 pages.
Office Action, dated Nov. 9, 2012, regarding U.S. Appl. No. 12/903,489, 29 pages.
Notice of Allowance, dated Apr. 9, 2014, regarding U.S. Appl. No. 13/902,855, 12 pages.
Notice of Allowance, dated May 6, 2016, regarding U.S. Appl. No. 14/085,514, 9 pages.

* cited by examiner

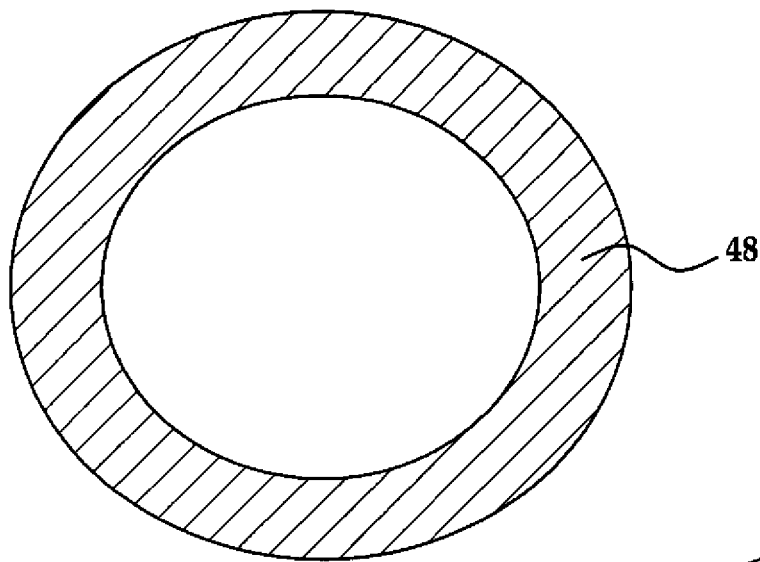
FIG. 3A
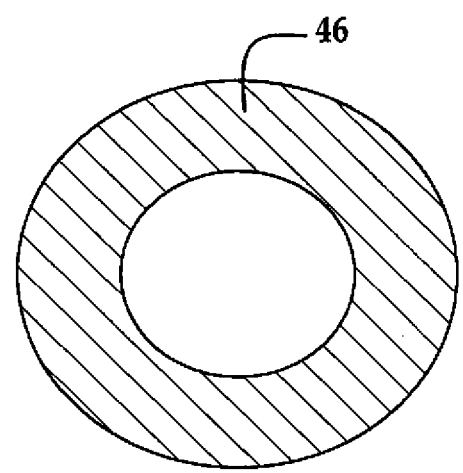
FIG. 3B
FIG. 3C
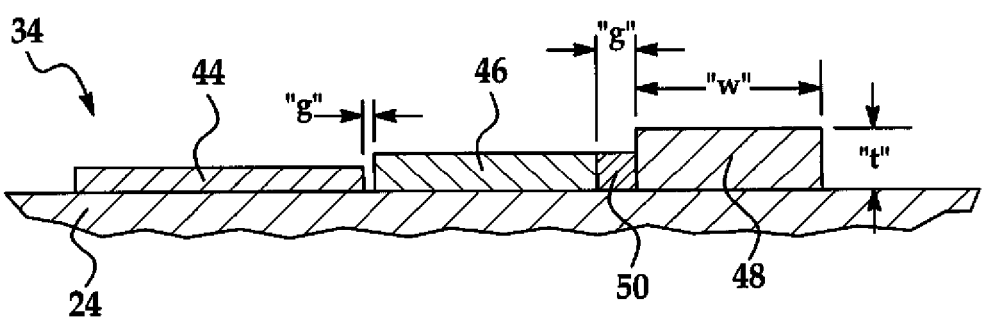
FIG. 4

| Ply # | Third Region | Second Region | First Region |
|---|---|---|---|
| 1 | 0 | 0 | 0 |
| 2 | 90 | 90 | 90/+45 |
| 3 | none | none | -45 |
| 4 | 90 | 0 | 0 |
| 5 | 90 | 0 | 0 |
| 6 | none | none | -45 |
| 7 | 90 | 90 | 90/+45 |
| 8 | 0 | 0 | 0 |

BONDED PATCH HAVING MULTIPLE ZONES OF FRACTURE TOUGHNESS

CROSS REFERENCE TO RELATED APPLICATIONS

This application is a divisional of application Ser. No. 12/706,799, filed Feb. 17, 2010, status pending, which is a continuation-in-part of co-pending U.S. patent application Ser. No. 12/400,519 filed Mar. 9, 2009; Ser. No. 12/400,475 filed Mar. 9, 2009; and Ser. No. 12/400,561 filed Mar. 9, 2009, all of which applications are incorporated by reference herein in their entireties.

TECHNICAL FIELD

This disclosure generally relates to fabricating and reworking structures, and deals more particularly with a patch having multiple regions with differing fracture toughnesses for controlling the advance of a disbond in the patch, as well as to a method of controlling the advance of the disbond.

BACKGROUND

Composite structures sometimes have localized areas containing one or more inconsistencies that may require rework in order to bring the structure within design tolerances.

In the past, one rework process was performed using a patch that was placed over the inconsistent area and secured to the parent structure using mechanical fasteners. This rework technique was desirable because the condition of the patch could be monitored over time by visually inspecting the fasteners. However, the use of fasteners may increase aircraft weight and/or drag on the aircraft, and may be esthetically undesirable in some applications.

In other applications, rework patches have been secured to a parent structure using a bonded joint, however this technique may also require the use of mechanical fasteners that provide secondary load paths forming an arrestment mechanism to limit the growth of an inconsistency. Furthermore, changes in a bonded joint securing a rework patch on a parent structure, such as the advance of a disbond, may not be easily monitored over time because the attaching mechanism of the joint or joint interface may not be visible.

Accordingly, there is a need for a bonded patch used to rework an area of a structure that controls possible changes in the bond joint in a manner that allows the changes to be detected and/or predicted over time. There is also a need for a method of controlling the advance of a disbond in the patch.

SUMMARY

The disclosed embodiments provide a composite rework patch for reworking structures without the need for mechanical fasteners. The rework patch includes features that allow visual inspection of the condition of the reworked area over time and permit reliable prediction of future bond joint changes. Because the condition of the reworked area may be visually inspected and predictions made about future bond condition, the bonded rework patch and visual inspection technique may allow certification of the rework by aircraft certifying authorities. The patch includes multiple regions and separation zones having differing fracture toughnesses which aid in controlling the advance of a disbond in the patch.

According to one disclosed embodiment, a patch is provided for reworking an inconsistent area in a structure. The patch includes a laminate patch and a layer of adhesive for bonding the laminate patch to the structure. The laminate patch includes a first disbond control region, a second disbond control region around the first region, and a separation zone between the first and second control regions. The separation zone has a fracture toughness greater than the fracture toughness of the first control region. The second control region and the separation zone may be arranged substantially concentrically around the first control region. In one application, the fracture toughness of the separation zone is at least approximately 25% greater than the fracture toughness of the first control region. The laminate patch includes a plurality of composite plies wherein the plies in the first control region and the plies in the separation zone respectively possess differing characteristics related to fracture toughness.

According to another disclosed embodiment, a composite laminate patch is provided which is adapted to be bonded to a composite structure for reworking an inconsistent area of the structure. The laminate patch comprises a first control region, at least a second control region surrounding the first region, and at least a first separation zone contiguous to and disposed between the first and second control regions. The first control region substantially covers the inconsistent area of the structure for controlling the advance of a disbond in the patch. The second control region is ring shaped and controls the advance of a disbond from the first control region. The ring-shaped separation zone is contiguous to and disposed between the first and second control regions and functions to control the advance of the disbond from the first region to the second region. The first separation zone has an interlaminar fracture toughness that is greater than that of the first control region. The second control region has an interlaminar fracture toughness that is greater than that of the first control region. The second control region and the first separation zone may be arranged substantially concentrically around the first control region.

According to still another embodiment, a composite laminate patch is provided that is adapted to be bonded to a composite structure for reworking an inconsistent area of the structure. The laminate patch comprises an inner-control region, N number of outer control regions surrounding the inner control region, and N number of separation zones. The inner control region substantially covers the inconsistent area and is operable for controlling the advance of a disbond in the patch. The outer control regions surround the inner control region and function to control the outward advance of the disbond beyond the inner control region. The separation zones respectively surround the control regions and are operable for defusing fracture energy of the disbond as the disbond advances beyond a control region.

According to a disclosed method embodiment, the advance of a disbond is controlled in a laminate patch that is bonded to a structure covering an inconsistent area. The method includes forming first and second control regions and forming a separation zone in the patch between the first and second control regions. The first control region overlies the inconsistent area of the structure and is operable for controlling the advance of a disbond. The second control region in the patch surrounds the first control region and is operable for controlling the advance of a disbond outwardly beyond the first control region. The separation zone is operable for defusing fracture energy of the disbond as the disbond advances from the first control region to the second control region.

The disclosed embodiments satisfy the need for a bonded composite rework patch and related method that allow reworking an inconsistent area in a composite structure, in which the condition of the rework can be visually monitored, and a change of the bonded joint may be predicted based on the visual inspection.

BRIEF DESCRIPTION OF THE ILLUSTRATIONS

FIGS. 3a-3c are illustrations of plan views respectively of sections of the adhesive layer shown in FIG. 3.

FIG. 4 is an illustration of a sectional view taken along the line 4-4 in FIG. 3.

DETAILED DESCRIPTION

Figure 1:
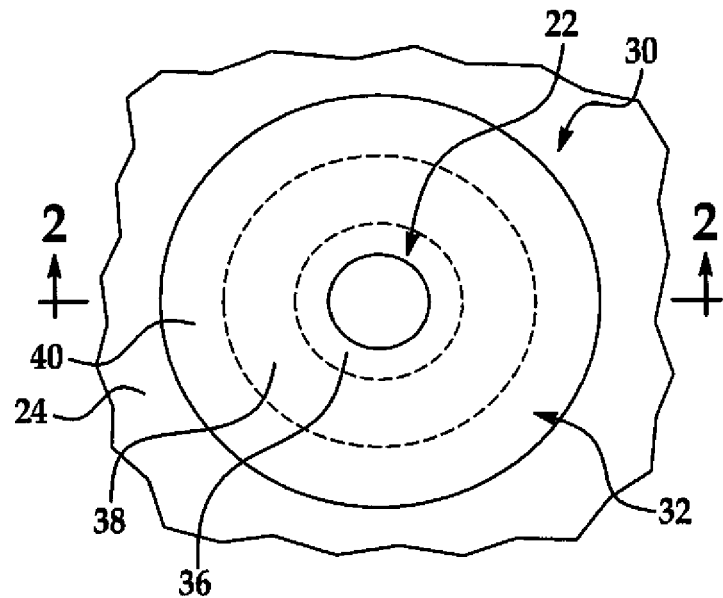
FIG. 1 is an illustration of a bonded rework patch on a composite structure.
Figure 2:
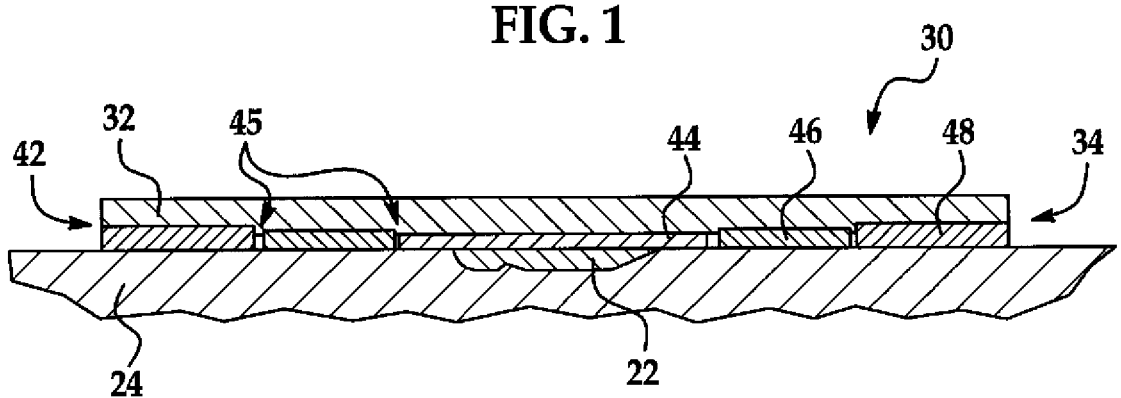
FIG. 2 is an illustration of a sectional view taken along the line 2-2 in FIG. 2.

Referring now to FIGS. 1 and 2, according to the disclosed embodiments, a composite rework patch 30 is used to rework an inconsistent area 22 in a composite structure 24. As used herein, "inconsistent area", "inconsistency" and "inconsistencies" each refer to a localized area in the composite structure 24 that may be outside of designed tolerances. The inconsistency 22 may comprise, for example and without limitation, a void, a dent, or a porosity that may occur at the time that the composite structure 24 is manufactured, or later during the service life of the composite structure 24. The term "rework" as used herein is intended to encompass both factory processes and in-service applications for addressing structural inconsistencies and structural improvements. The term "patch" as used herein is intended to include doublers that may be used to rework, alter, improve and/or strengthen an area of the composite structure 24.

The composite rework patch 30 comprises a laminate layer 32 which overlies the inconsistent area 22 and is bonded to the composite structure 24 by a layer 34 of a structural adhesive forming a bond joint 42. The size of the composite rework patch 30 may vary with the application and the dimensions of the inconsistent area 22. The adhesive layer 34 divides the bond joint 42 and inconsistent area 22 into first, second and third control regions 36, 38, 40 respectively, that may provide a graceful reduction of transition loads transmitted between the composite structure 24 and the composite rework patch 30. The first control region 36 is centrally located over the inconsistent area 22, and the second and third control regions 38, 40 may respectively comprise a pair of substantially concentric rings surrounding the centrally located first control region 36. While the control regions 36, 38, 40 are shown as being generally circular in the disclosed embodiment, a variety of other shapes are possible. Also, in other embodiments, the composite rework patch 30 may have only two control regions 36, 38, or may have more than three control regions 36, 38, 40.

The first control region 36 may exhibit favorable in-plane adhesive stresses. The second control region 38 may be referred to as a durability region and any disbond within this region between the laminate layer 32 and the composite structure 24 may need to be evaluated and quantified in order to determine whether rework should be performed. The third control region 40, which may be dominated by in-plane shear and peeling moments, may affect the behavior of the entire structural bond between the laminate layer 32 and composite structure 24.

Figure 3:
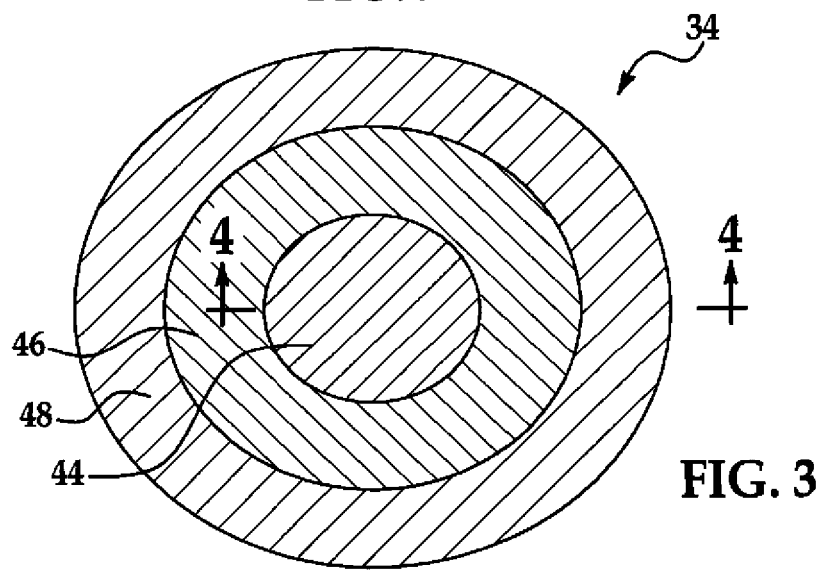
FIG. 3 is an illustration of a plan view of the adhesive layer shown in FIG. 2.

Referring now particularly to FIGS. 2-4, the adhesive layer 34 may comprise a central first adhesive section 44 surrounded by concentric ring shaped adhesive sections 46 and 48. The size and shape of the adhesive sections 44, 46, 48 generally correspond to the first, second and third control regions 36, 38, 40 respectively of the v rework patch 30. Each of the adhesive sections 44, 46, 48 may comprise one or more plies of a commercially available structural adhesive which is generally available in film or sheet form that may be cut to the desired shape. The adhesive sections 44, 46, 48 may also be formed from a commercially available structural adhesive paste. As previously noted, multiple plies (not shown) of the adhesive sheet material may be built up to form a desired thickness "t" for each of the adhesive sections 44, 46, 48. The strength of the bond may be tailored using the thickness "t" between laminate layer 32 and composite structure 24. In some applications only a single ply of adhesive sheet material may be required, while in other applications, more than one ply may be necessary, depending on the application and the thickness of the adhesive sheet.

In one embodiment, circumferential gaps "g" may be formed between adhesive sections 44, 46, 48 to aid in arresting the growth of potential debonding between the laminate layer 32 and the composite structure 24. A filler 50 may be placed in one or both of the gaps "g" to aid in the arrestment.

The properties of each of the adhesive sections 44, 46, 48 may be tailored in a manner that affects the rate at which first, second and third control regions 36, 38, 40 of the bond joint 42 respectively release strain energy. Tailoring of each of the adhesive sections 44, 46, 48 may be achieved by altering the dimensions of the adhesive sections 44, 46, 48, such as thickness "t" or width "w", or by altering the form of the film, paste, scrim, etc., as well as by altering the structural properties of the adhesive layer, such as fracture toughness, peel or shear properties, or by providing the gap "g" between the adhesive sections 44, 46, 48. Fracture toughness may be described as the general resistance of a material having a crack to delaminate and is a quantitative way of expressing a material's resistance to brittle fracture when a crack is present. Materials having a relatively high value of fracture toughness may be more likely to undergo ductile fracture, while materials having relatively low values of fracture toughness may be more likely to undergo brittle fracture. A spacer or filler 50 may be interposed between adhesive sections 44, 46, 48 to aid in arresting disbond growth.

The use of the tailored adhesive sections 44, 46, 48 may result in a bonded composite rework patch 30 that is divided into multiple control regions 36, 38, 40 that release strain energy at different rates. The first, second, and third control regions 36, 38, 40 provide for a graceful reduction of transition loads between the laminate layer 32 and the composite structure 24, which may not only allow prediction of a course of disbond extension, but can allow assessment of the condition of the composite rework patch 30 through simple visual inspection, or other non-destructive inspection techniques. Although three control regions 36, 38, 40 are shown and discussed, more or less than three control regions may be possible.

The first control region 36 of the composite rework patch 30 which overlies the inconsistent area 22 exhibits favorable in-plane stresses that may suppress the stress concentration around the boundary of a disbond of the bond joint 42. The global adhesive stresses within the first control region 36 may reduce the strain energy release rate necessary for extension of a disbond under maximum load limits applied to the composite structure 24.

The characteristics of the composite rework patch 30 within the second control region 38 may result in the release of strain energy at a rate greater than that of the first control region 36. Any disbond that may occur in the bond joint 42 within the second control region 38 may be anticipated by a fatigue durability disbond curve (not shown) which defines the work input required to initiate disbond growth. The characteristics of the third control region 40 are selected such that the strain energy release rate within the third control region 40 is greater than that of the second control region 38 to discourage disbond initiation and growth, as well as in-plane shear and peeling moments.

Figure 5:
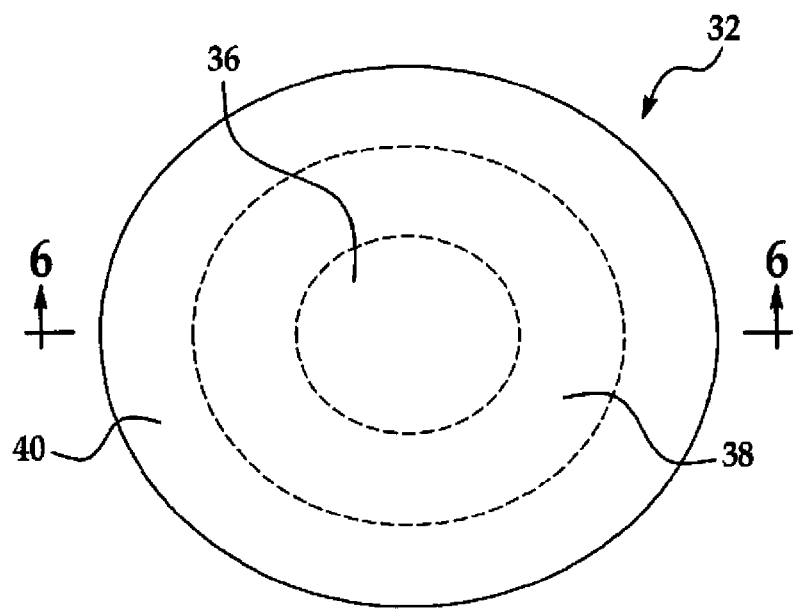
FIG. 5 is an illustration of a plan view of a composite laminate patch forming part of the rework patch shown in FIG. 1.
Figure 6:
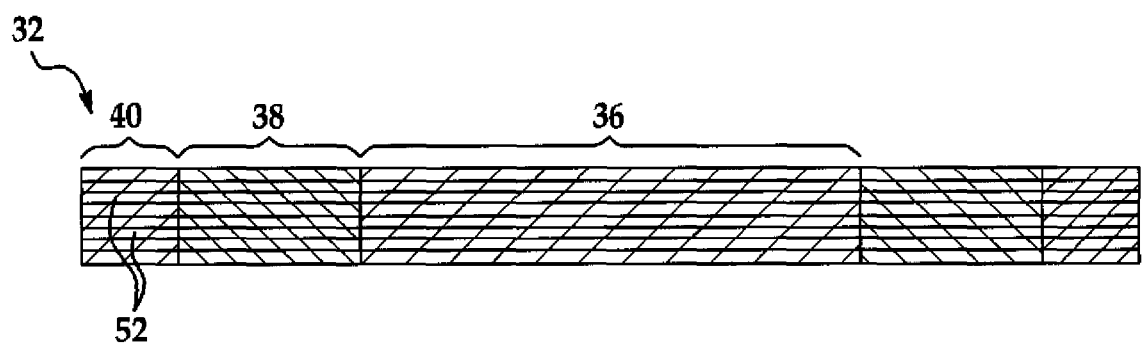
FIG. 6 is an illustration of a sectional view taken along the line 6-6 in FIG. 5.

Attention is now directed to FIGS. 5 and 6 which illustrate a laminate layer 32 comprising multiple plies 52 of fiber reinforced polymer in which the plies 52 may be tailored in order to aid in achieving first, second and third control regions 36, 38, 40 respectively, having the desired strain energy release rates. Strain energy release rate within the laminate layer 32 may be tailored within the control regions 36, 38, 40 by selecting and/or arranging the plies such that the plies in each of the control regions 36, 38, 40 have different characteristics. In other words, each of the control regions 36, 38, 40 may have ply characteristics that are unique to that region. Thus, for example, the plies in the second control region 38 may have characteristics that are different from those in control regions 36 or 40, and the plies in control region 36 may have characteristics that are different than those in control regions 38 and 40. As used herein, "characteristics" and "ply characteristics" refer to, without limitation: the type, size or quantity of fiber reinforcement in a ply; ply thickness; gaps between the plies; materials, elements or structures placed between the plies; the number of plies; the type or density of matrix used in the ply; the layup orientation (angle) of each ply and/or the sequence of ply orientations in a stack of the plies.

The strain energy release rate within one of more of the control regions 36, 38, 40 may be tailored by forming a scarf or tapered joint (not shown) between the laminate layer 32 and the composite structure 24. The strain energy release rate may also be tailored by providing gaps (not shown) in certain areas between plies 52 in a manner that may alter the mechanical properties of the laminate layer 32 in each of the control regions 36, 38, 40. Also, it may be possible to employ differing orientation sequences of the plies 52 in order to aid in achieving the defined control regions 36, 38, 40. Orientation refers to the layup angle or direction of reinforcing fibers in a ply, for example and without limitation, 0°, 30°, 60°, 90° and/or 0°, +45°, −45°, 90°.

In the example illustrated in FIGS. 5 and 6, the materials used in the plies 52 and/or the orientation sequences within the first control region 36 result in the highest rate of strain relief, while the selection of these materials and/or ply orientation sequences in second and third control regions 38 and 40 respectively result in intermediate and lowest rates of release of strain energy, respectively. In other embodiments, however, depending on the application, the third control region 40 may possess highest rate of strain energy relief, while the first control region 36 possesses the lowest rate of strain energy relief.

Figures 7, 8:
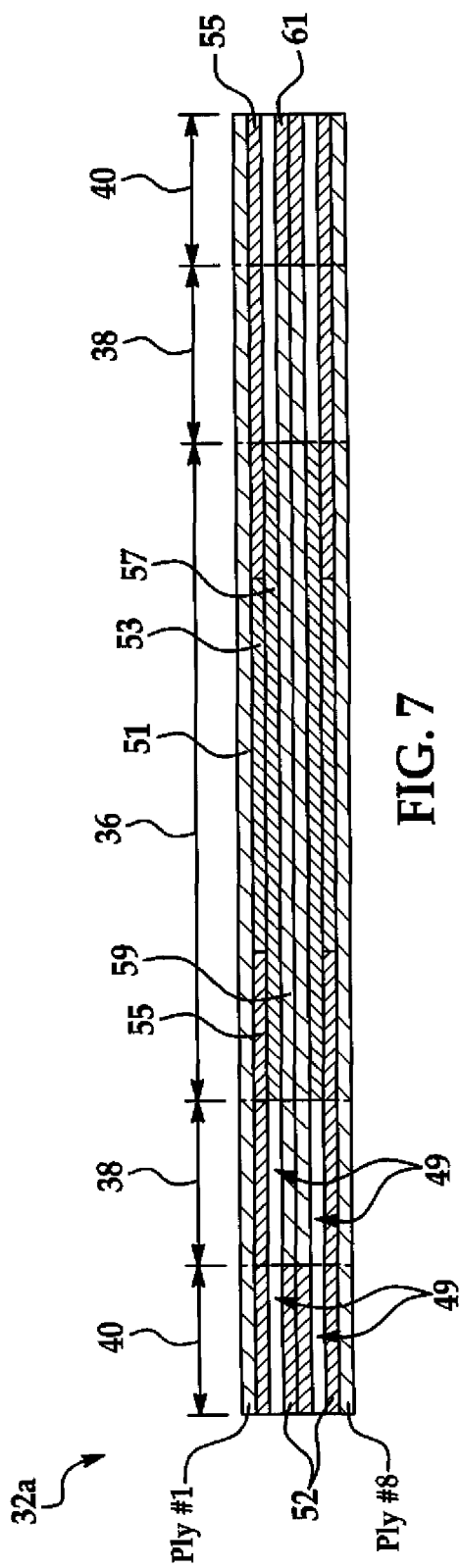
FIG. 7 is an illustration of a sectional view similar to FIG. 6, but showing details of a tailored laminate patch divided into regions having differing interlaminar toughness.
FIG. 8 is an illustration of a table showing a ply schedule for the differing regions of the tailored laminate patch shown in FIG. 7.
Figure 9:
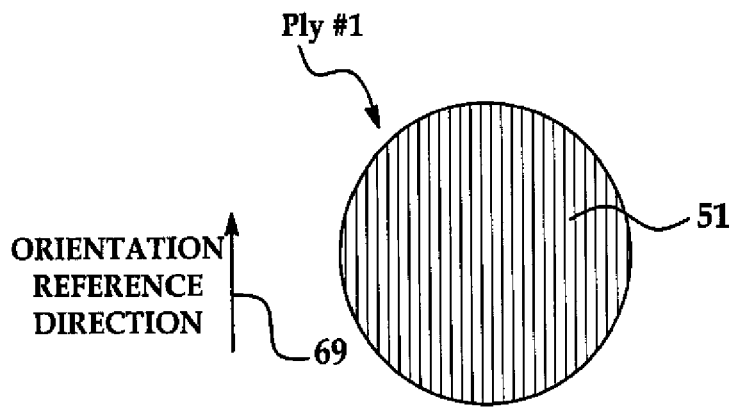
FIGS. 9-12 are illustrations of plan views respectively illustrating plies 1-4 in the laminate patch shown in FIG. 7.
Figure 10:
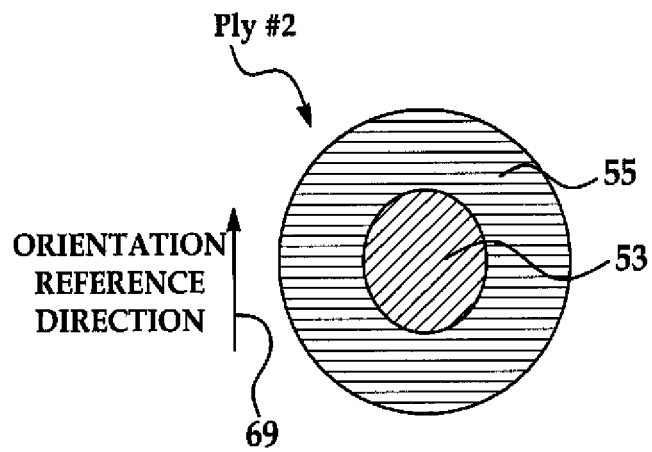
Figure 11:
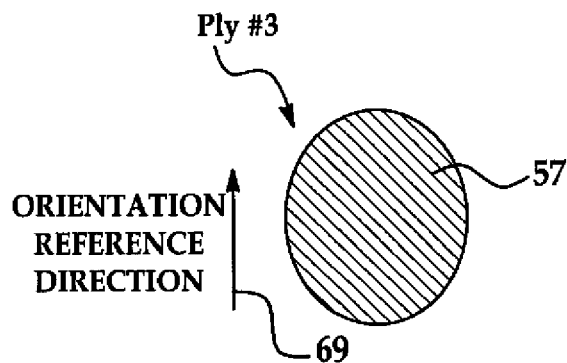
Figure 12:
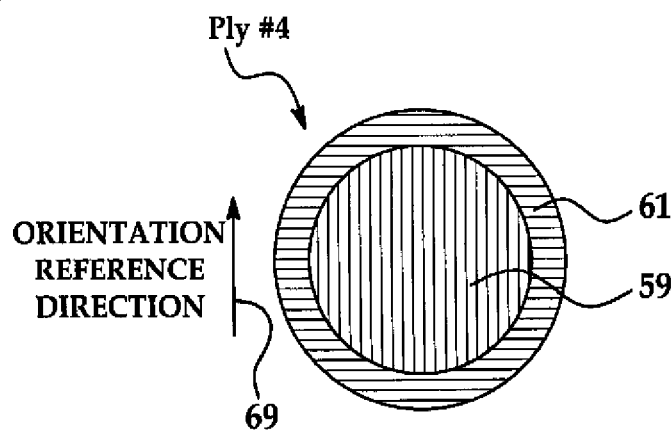

Attention is now directed to FIG. 7 which illustrates a typical tailored laminate patch 32a comprising eight plies 52 of fiber reinforced polymer, before being compacted and cured into a consolidated laminate. When viewed in plan, the shape of the tailored laminate patch 32a, including regions 36, 38, 40, may be substantially the same as that of the patch 32 illustrated in FIG. 5. The plies 52 forming the tailored laminate patch 32a may be referred to as plies #1-#8. FIG. 8 is a table illustrating the ply orientations for the laminate patch 32a within regions 36, 38, 40 for each of the plies #1-#8, while FIGS. 9-12 show the constituent sections of plies 1-4.

As mentioned above in connection with FIGS. 5 and 6, the characteristics of the plies 52 may be different in each of the regions 36, 38, 40. The rate of release of strain energy in regions 36, 38 and 40 is related to the modulus or stiffness that defines the interlaminar toughness of the patch 32a in the respective region 36, 38, 40. In the disclosed embodiment, the first region 36 has the highest interlaminar fracture toughness, while the third region 40 possesses the lowest interlaminar fracture toughness. In one practical application for example, and without limitation, the third region 40 has an interlaminar fracture toughness that may be between approximately 0.5 and 1.0 in-#/in$^2$, and the second region 38 has an interlaminar fracture toughness that may be between approximately 1.5 and 2.0 in-#/in$^2$. The first region 36 in this example has an interlaminar fracture toughness that may be equal to or greater than approximately 2.5 in-#/in$^2$. In other embodiments, however, the third region 40 may have the highest interlaminar fracture toughness and the first region 36 may have the lowest interlaminar fracture toughness, with the interlaminar fracture toughness of the second region 38 being between that of the first and third regions 36, 40, respectively.

The particular values of the interlaminar fracture toughness for the regions 36, 38, 40 will depend upon the application and the particular mechanical properties of the plies 52 that are present within the regions 36, 38, 40. Moreover, the values for the interlaminar fracture toughness within the regions 36, 38, 40 may be tailored to the properties of the adhesive layer 34 (see FIG. 3), including the sections 44, 46, 48 of the adhesive layer 34 so that the sections 44, 46, 48 of the adhesive layer 34 and the mechanical properties of the laminate patch 32a within regions 36, 38, 40 are suitably matched to provide maximum performance. Although not shown in FIG. 7, the sections 44, 46, 48 of the adhesive layer 34 respectively underlie, and may be substantially coextensive with the regions 36, 38, 40 of the laminate patch 32a.

As previously discussed, the interlaminar fracture toughness within the regions 36, 38, 40 may be controlled by using differing prepreg materials in the plies 52, and/or by overlapping the plies 52 between adjacent ones of the regions 36, 38, 40, and/or by using different ply orientation sequences within each of the regions 36, 38, 40. For example, FIG. 8 illustrates differing ply orientation sequences for plies #1-#8 within each of the regions 36, 38, 40. It can be seen for example, that in comparing the orientation sequence of the plies 52 for the second and third regions, 38, 40 respectively, ply #4 and ply #5 are oriented at 90° in the third region 40, but have a 0° orientation in the second region 38. As previously mentioned, ply orientation refers to the direction of orientation of unidirectional reinforcing fibers held in a polymer matrix, usually a prepreg, which forms each of the plies 52. The sequence of orientations of the plies #1-#8 for the first region 36 is different from the sequence of orientations for either the second or third regions, 38, 40.

Referring now particularly to FIGS. 7 and 9-12, it can be seen that ply #1 comprises a single, circularly shaped section 51 (FIG. 9) having a 0° degree fiber orientation relative to an orientation reference direction 69, which extends across all three regions 36, 38, 40. Ply #2 includes a circular center section 53 (FIG. 10) having a +45° fiber orientation, and an outer, ring shaped section having a 90° orientation. As a result of the configuration of ply #2, region 36 has combined fiber orientations of 90° and +45° degrees, while regions 38 and 40 both have 90° fiber orientations. Ply #3 comprises a single section 57 (FIG. 11) within region 36 having a −45° fiber orientation, while in regions 38 and 40, gaps 49 (FIG. 7) are present. Finally, ply #4 (FIG. 12) comprises a section 59 having a 0° fiber orientation that extends throughout regions 36 and 38. Section 59 is surrounded by a section 61 having a 90° fiber orientation which is confined to the third region 40. Ply #s 5-8 shown in FIG. 7 are essentially a mirror image of ply #s 1-4 described above.

From the forgoing, it can be appreciated that each of the regions 36, 38, 40 possesses a unique interlaminar fracture toughness in the tailored laminate patch 32a, and/or the bond joint 42 (FIG. 2). The interlaminar fracture toughness within the regions 36, 38, 40 of the patch 32a may be tailored to and compliment the global adhesive stresses in the bond joint 42 so as to contain and resist growth of inconsistencies either in the patch 32a or the bond joint 42.

Figure 13:
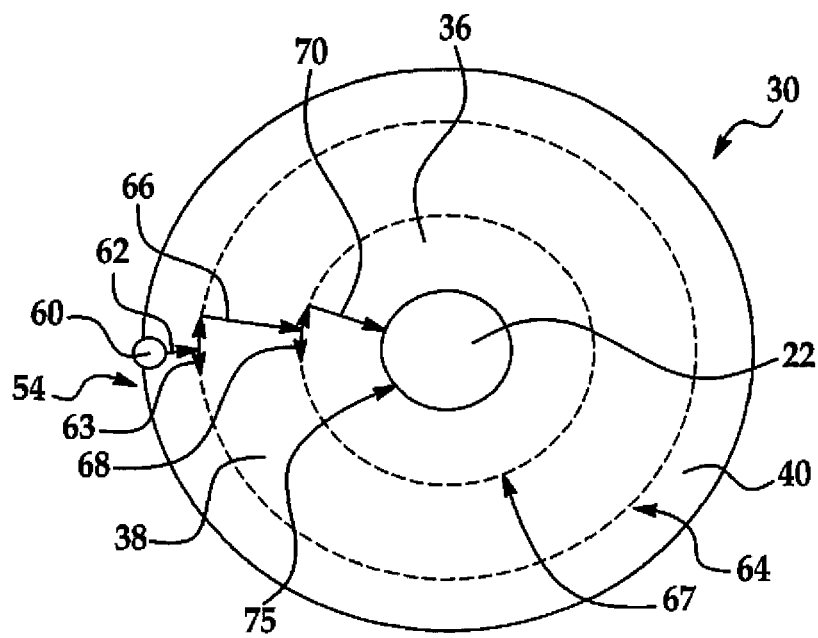
FIG. 13 is an illustration of a plan view of the rework patch shown in FIG. 1, and illustrating a typical propagation path of a debonding.

FIG. 13 illustrates the manner in which a disbond beginning at outer edge 60 of the third control region 40 and growing inwardly, may be arrested. The disbond beginning at edge 60 may be illustrated in this scenario as growing directly inward, as shown at 62 until the boundary is reached between control regions 38 and 40. As a result of the difference in materials in control regions 36, 38, 40, and/or the presence of a gap "g" or filler 50 (FIG. 4), and/or the difference in the adhesive properties of the sections 44, 46, 48 of the adhesive layer 34 (FIG. 2), the disbond is arrested and may move circumferentially around 63 the boundary 64 of the third control region 40. Another scenario may have a disbond progressing from the third region 40 and into the second control region 38, and progressing inwardly toward the first control region 36, as indicated by the numeral 66. When the progression of the disbond reaches the boundary 68 between control regions 36 and 38, it is arrested and may move circumferentially around the boundary 68.

Figure 14:
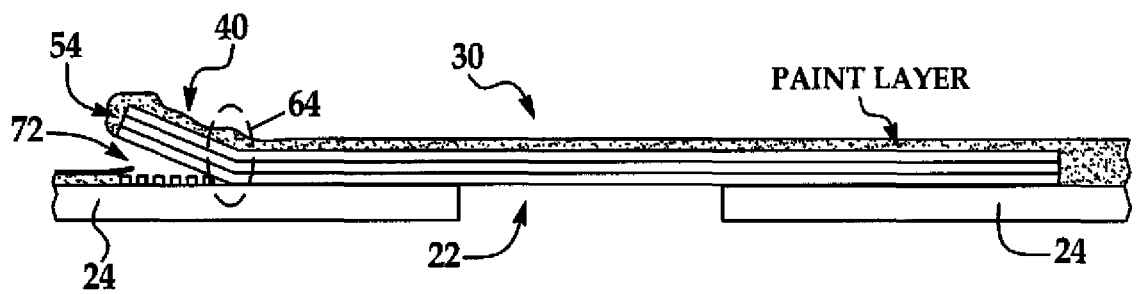
FIGS. 14-16 are illustrations of sectional views showing progression of the debonding through regions of the patch.

Referring concurrently to FIGS. 13 and 14, as the disbond 72 moves inwardly from the beginning point 60, the outer edge 54 of the rework patch may peel upwardly thereby cracking overlying paint (not shown) which provides a visual indication of disbond initiation and/or growth within the third control region 40. This visual indication of a disbond may terminate at the boundary 64 between control regions 38 and 40.

Figure 15:
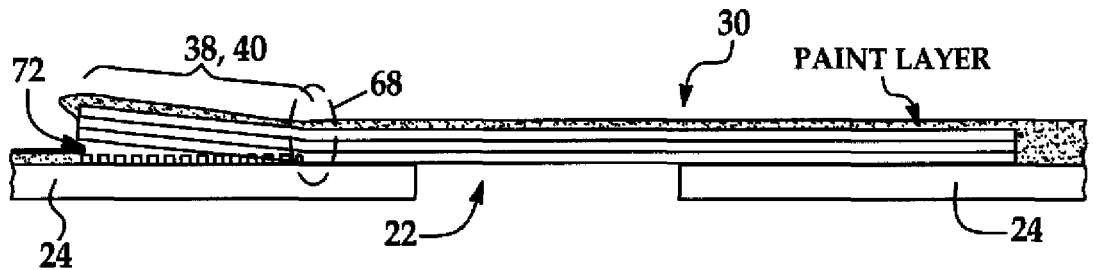
Figure 16:
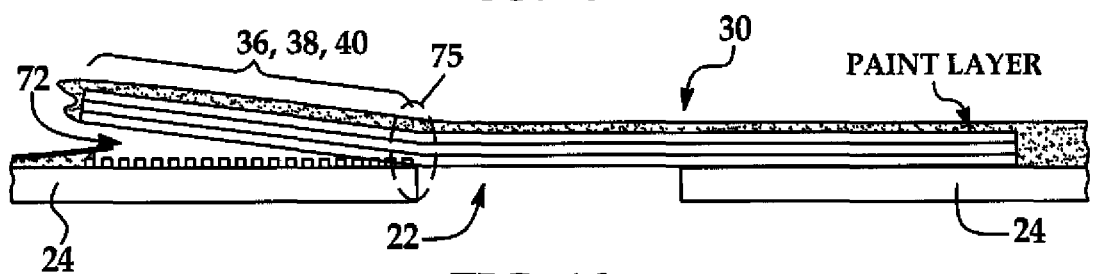

As shown in FIG. 15, if the disbond 72 continues into the second control region 40 toward the boundary 68, the composite rework patch 30 in the area of the control regions 38 and 40 may peel upwardly, thereby further cracking overlying paint to provide a visual indication that the disbond has progressed into or through the second control region 38. FIG. 16 illustrates the disbond having progressed up to the boundary 75 of the inconsistent area 22. At this point, the areas of the composite rework patch 30 and all three control regions 36, 38, 40 may peel upwardly to further crack overlying paint, thereby providing a still more obvious visual indication that the disbond has advanced to a point where the composite rework patch 30 may need further attention. From the foregoing, it is apparent that the control regions 36, 38, 40 of the composite rework patch 30 provide a means of allowing nondestructive, visual inspection of the condition of the composite rework patch 30, including the bond joint 42 between the patch 30 and the composite structure 24. As previously noted, other non-destructive inspection techniques may be used to assess the condition of the patch 30, instead of, or as a supplement to, visual inspection.

Figure 17:
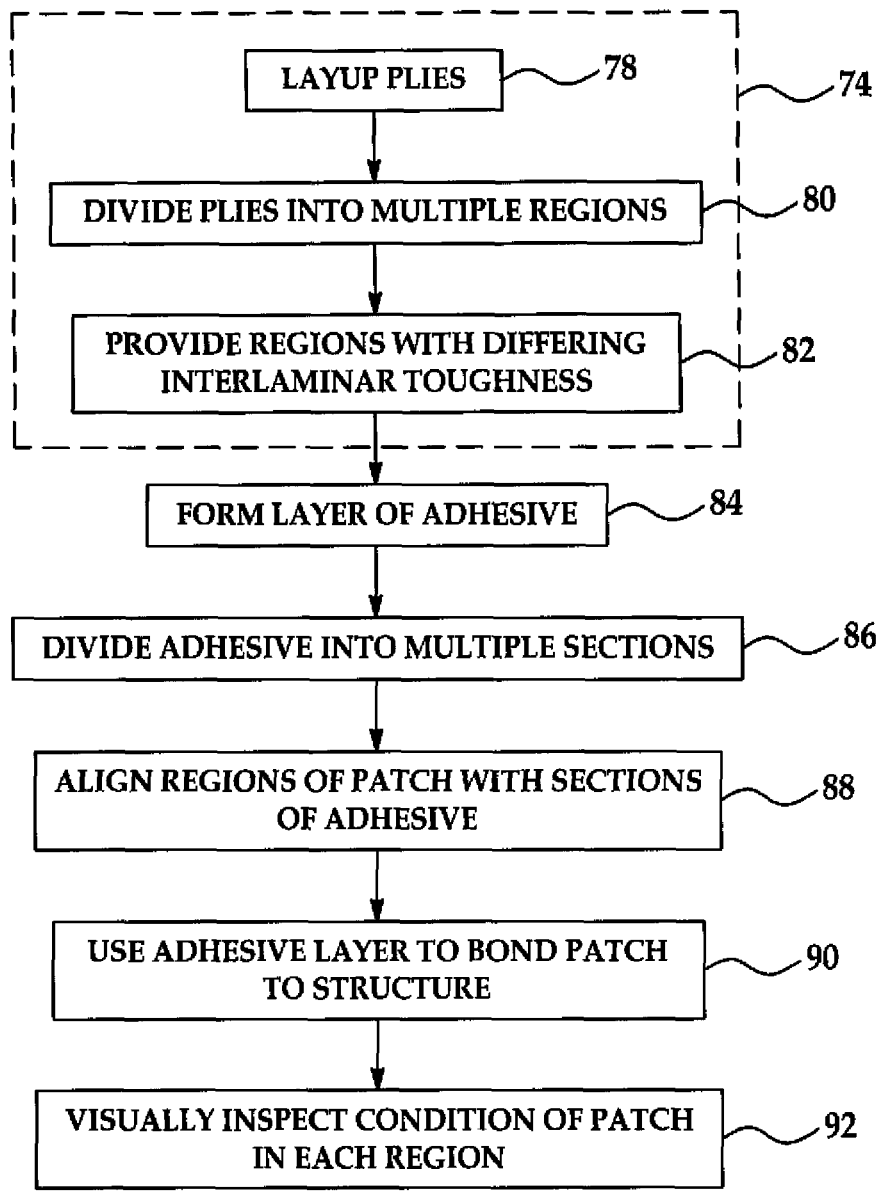
FIG. 17 is an illustration of a flow diagram for a method for reworking an inconsistent area of a composite structure.

Attention is now directed to FIG. 17 which illustrates a method for reworking areas of a composite structure containing inconsistencies using the tailored rework patch 32a discussed above. The tailored patch 32a is formed by a series of steps 74 beginning with laying up plies 78 using a ply schedule and orientation sequence that may be similar to those shown in FIGS. 7 and 8. As shown at 80, the plies 52 are divided into multiple regions 36, 38, 40 as part of the ply layup 78. Also, the regions 36, 38, 40 are provided with differing interlaminar fracture toughness as shown at 82, by using differing materials and/or ply orientations as previously discussed.

At 84, a layer 34 of adhesive is formed, and at 86, the adhesive layer 34 is divided into multiple sections 44, 46, 48. The regions 36, 38, 40 of the tailored patch 32a are then aligned, as shown at step 88, with the sections 44, 46, 48 of the adhesive layer 34. The adhesive layer 34 is used to bond the tailored patch 32a to a composite structure, as shown at step 90. At step 92, the patch may be visually inspected over time to determine the condition of the patch in each of the regions 36, 38, 40.

Figure 18:
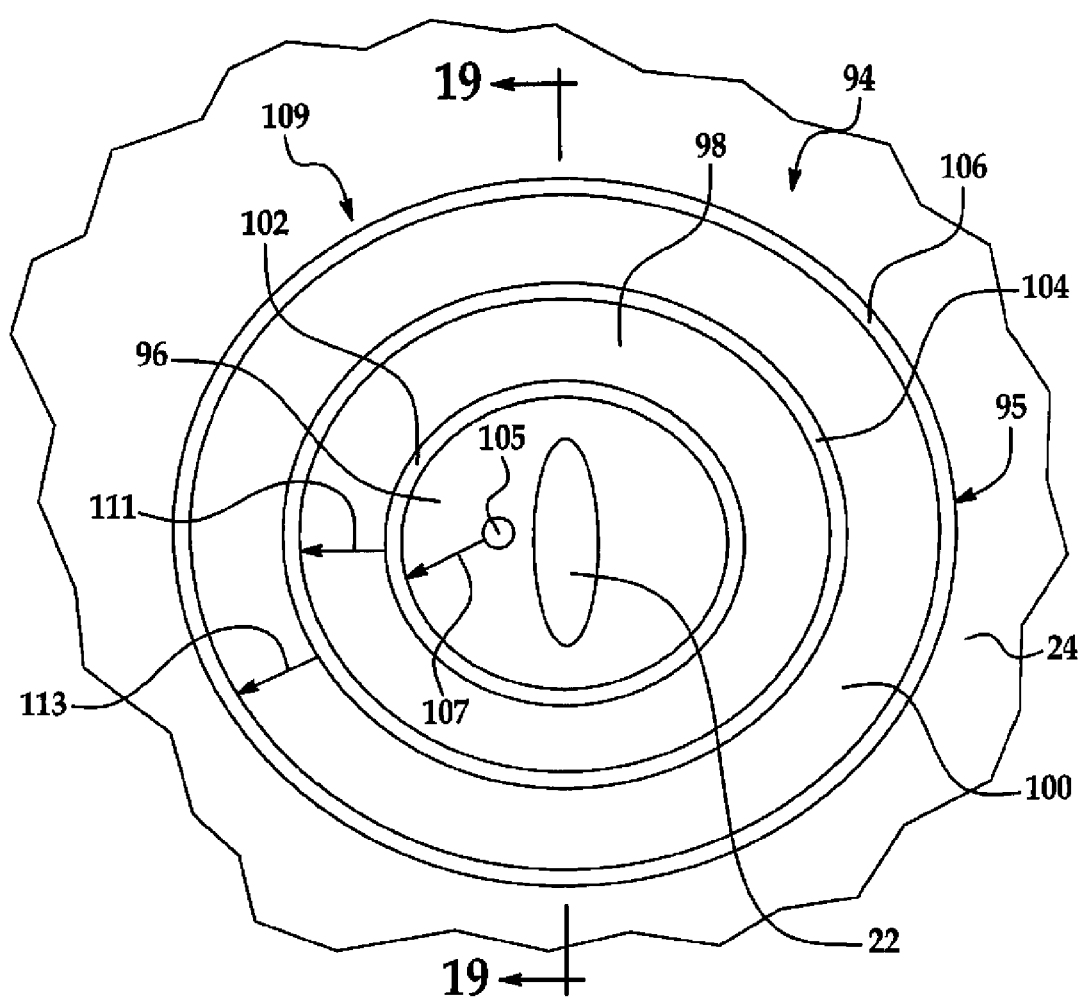
FIG. 18 is an illustration of a plan view of an alternate embodiment of a composite patch.
Figure 19:
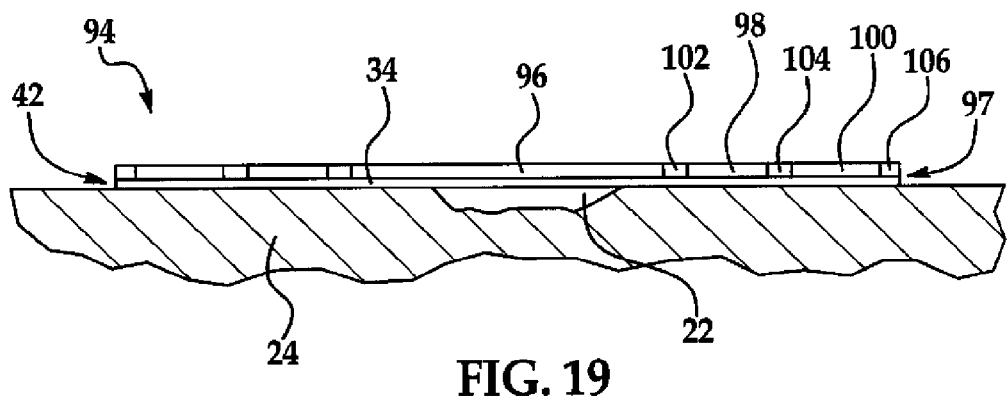
FIG. 19 is an illustration of a sectional view taken along the line 19-19 in FIG. 18.

Attention is now directed to FIGS. 18 and 19 which illustrate another embodiment of a laminate patch 94 suitable for reworking an inconsistent area 22 in a structure 24 which may comprise a composite structure such as the skin of an aircraft (not shown). In the illustrated example, the patch 94 is depicted as a doubler which overlies the surface of the skin structure 24, however, the patch 94 may be used in other applications and may have tapered outer edges forming a scarf joint (not shown), allowing the patch 95 to be recessed within the structure 24 so as to lie flush with the skin surface, as disclosed in U.S. patent application Ser. No. 12/400,561 filed Mar. 9, 2009, which is incorporated by reference herein. The patch 94 comprises a multi-ply laminate patch 95 and a layer of adhesive 97 forming a bondline 42 that bonds the laminate patch 95 to the composite structure 24, covering the inconsistent area 22. The laminate patch 95 comprises N number of control regions, which in the illustrated example includes three regions 96, 98, 100, that are respectively surrounded by N number of separation zones e.g. 102, 104, 106.

A first inner control region 96 is generally circular in shape and substantially covers the inconsistent area 22. A second, outer control region 98 is generally ring shaped and surrounds the first control region 96. A ring shaped, first separation zone 102 is contiguous to and is disposed between the first and second control regions 96, 98. A third, ring shaped control region 100 surrounds the second control region 98, and a second ring shaped separation zone 104 is contiguous to and disposed between the second and third control regions 98, 100. Finally, a third, ring shaped separation zone 106 is contiguous to and surrounds the third control region 100. As best seen in FIG. 18, the second and third outer control regions 98, 100 respectively, as well as each of the separation zones 102, 104, 106 are concentrically arranged around the circular inner control region 96. However, in some embodiments, these features need not be concentric, and shapes other than a circle and rings are possible.

In this example, the layer of adhesive 97 that forms the bondline 42 possesses substantially constant characteristics over substantially the entire area of the layer 97, however, in some embodiments, the adhesive layer 97 may be tailored to possess differing characteristics over this area, similar to the adhesive layer 34 employed in the embodiment illustrated in FIGS. 2-4, previously discussed. Thus, in the illustrated embodiment, tailoring of characteristics of the laminate patch 95, rather than tailoring the adhesive layer 97 is employed to control the growth or advance of a disbond originating within the area covered by the inner control region 96.

In the illustrated embodiment, one or more characteristics of the laminate patch 95 are tailored in order to achieve the control regions 96, 98, 100 and separation zones 102, 104, 106. These characteristics may be tailored in a manner similar to that of the embodiment previously described in connection with FIGS. 5-12. The characteristics may include, but are not limited to one or more of the following: a constituent of the plies such as the type of reinforcing fiber, the thickness of the plies, the number of the plies, the presence of splices between one or more of the plies, the fiber orientation of the plies, and the sequence of fiber orientations of the plies.

In the illustrated embodiment, the laminate patch 95 is tailored such that the interlaminar fracture toughness of the control regions 96, 98, 100 increase outwardly from the inner control region 96. Thus, the interlaminar fracture toughness of the second, outer control region 98 is greater than that of the first, inner control region 96, and the interlaminar fracture toughness of the third, outer control region 100 is greater than that of the second, outer control region 98. However, in other embodiments, depending on the application and design goals, the laminate patch 95 may tailored such that the interlaminar fracture toughness of the control regions 96, 98, 100 increase progressively inwardly from the outer control region 100 to the inner control region 96.

In the illustrated embodiment, the interlaminar fracture toughness of each of the separation zones 102, 104, 106 is greater than the interlaminar fracture toughness of the first, inner control region 96. In one embodiment, the interlaminar fracture toughness of the separation zones 102, 104, 106 is at least approximately 25% greater than the interlaminar fracture toughness of the first, inner control layer 96.

The interlaminar fracture toughnesses of the separation zones 102, 104, 106 may be the same, or different from each other. The area and dimensions of the control regions 96, 98, 100 as well as the separation zones 102, 104, 106 may vary with the application. Generally, however, the width of each of the separation zones 102, 104, 106 is generally less than the widths of the control regions 96, 98, 100 which they separate. The particular values selected for the interlaminar fracture toughnesses may vary with the application. For example, and without limitation, in one practical embodiment, the constant Mode 1 interlaminar fracture toughnesses of control regions 96, 98, and 100 may be, respectively, 1.5 in-#/in$^2$, 2.5 in-#/in$^2$ and 3.0 in-#/in$^2$, wherein the constant Mode 1 interlaminar fracture toughness of each of the separation zones 102, 104, 106 is 2.0 in-#/in$^2$.

The patch 94 regulates the magnitude of the peak adhesive stresses and loads at the boundaries of the regions 96, 98, 100 and zones 102, 104, 106 that are transferred through the adhesive layer 97. Each region 96, 98, 100 and zone 102, 104, 106 has the ability to contain and localize the disbond 105. The multiple regions and zones may compliment the global adhesive stresses in the bond line 42 to contain and resist growth of the disbond 105 even in thick wing composite structures 24.

In use, a disbond 105 may be initiated near the inconsistent area 22 within the first, inner control region 96. As the applied load caused by the disbond 105 increases, the disbond 105 may advance or propagate outwardly as shown by arrow 107 toward the second, outer control region 98. As the disbond 105 approaches the second control region 98, the disbond 105 encounters and enters the first separation zone 102 which, as previously mentioned, has an interlaminar fracture toughness greater than that of the inner control region 96. The first separation zone 102 functions to defuse the fracture energy of the disbond 105 before it enters the second, outer control region 98 which has an interlaminar fracture toughness greater than that of the first, inner control region 96. As a result of this diffusion of fracture energy by the first separation zone 102, the growth or advancement of the disbond 105 is slowed and may be completely retarded before it enters the second control region 98, as shown by the arrow 110.

The second, outer control region 98 may function as a disbond depository by reducing the local peak shear and peel stresses to levels that may be nearly benign. At such stress levels, the patch 94 may be able to react any mid-span out of plane deformation due to a change in the stiffness between the patch 94 and the composite structure 24. In the event that the applied load continues to increase to a level that causes the disbond 105 to grow or advance again at 111, the third, outer control region 100 functions as a second disbond depository due to the fact that its interlaminar fracture toughness is greater than that of the second control region 98. Thus, the third control region 100 may mitigate shear-lag effects that may occur in the rework provided by the patch 94. Again, as the disbond 105 grows and advances from the second region 98 to the third control region 100, the second separation zone 104 functions to defuse the fracture energy of the disbond, thereby slowing its growth before it enters the third, outer control region 100, as shown by the arrow 113. The third separation zone 106 likewise functions to defuse the fracture energy of the disbond as it reaches the outer edge 109 of the third control region 100, thereby reducing the possibility of the disbond advancing beyond the outer edge 109.

The multiple disbond control regions 96, 98, 100 in combination with the separation zones 102, 104, 106 result in a patch 94 that may retard or arrest the growth of either a longitudinal or transverse disbond or a discrete type inconsistency 22 in a composite, metallic or hybrid material structure 24. The patch 94 may be useful under most loading conditions regardless of whether they are developed under hoop or skin in-plane shear stresses within the structure 24 due to pressurization loads on an aircraft, including up or down bending due to lateral gusts or maneuver loads. The stress singularities that may develop at the tip (not shown) of the disbond 105 may be drastically reduced by the patch 94. As a result, the patch 94 may retard disbond extension under both static and negative reverse fatigued loads.

Figure 20:
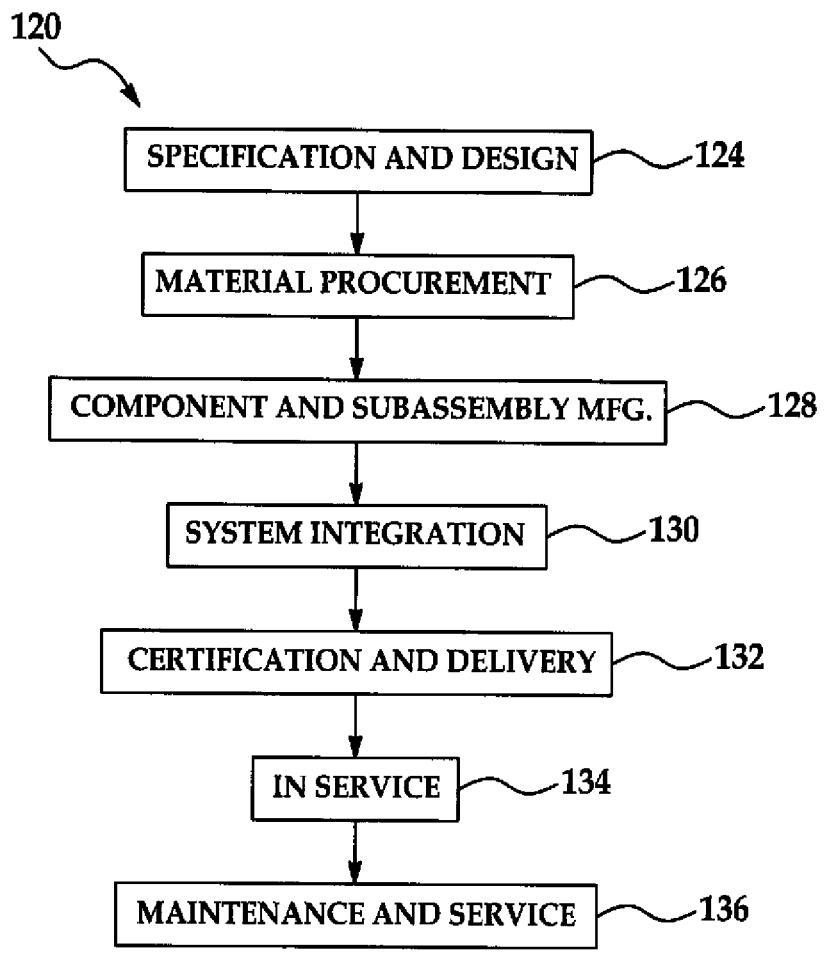
FIG. 20 is an illustration of a flow diagram of aircraft production and service methodology.
Figure 21:
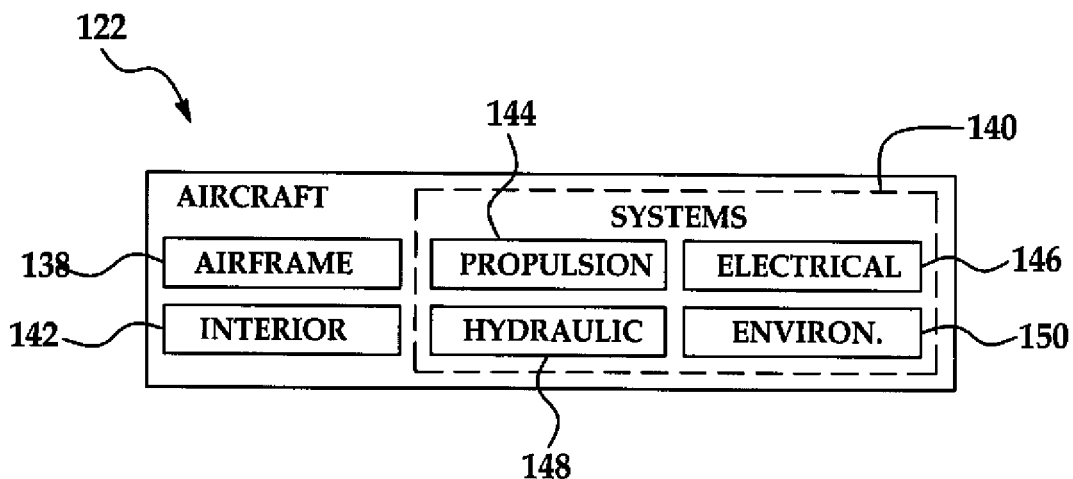
FIG. 21 is an illustration of a block diagram of an aircraft.

Embodiments of the disclosure may find use in a variety of potential applications, particularly in the transportation industry, including for example, aerospace, marine and automotive applications. Thus, referring now to FIGS. 19 and 20, embodiments of the disclosure may be used in the context of an aircraft manufacturing and service method 120 as shown in FIG. 20 and an aircraft 122 as shown in FIG. 21. During pre-production, exemplary method 120 may include specification and design 124 of the aircraft 122 and material procurement 126. The rework patch 94 may be specified and designed as part of the specification and design 124 of the aircraft 122, and procured as part of the procurement process 126.

During production, component and subassembly manufacturing 128 and system integration 130 of the aircraft 122 takes place. The patch 94 may be used during production to rework inconsistencies that occur during the manufacturing 128 and/or system integration 130. Thereafter, the aircraft 122 may go through certification and delivery 132 in order to be placed in service 134. The patch 94 may be used to rework inconsistencies in order to achieve certification of the aircraft 122 and/or to satisfy delivery requirements. While in service by a customer, the aircraft 122 is scheduled for routine maintenance and service 136 (which may also include modification, reconfiguration, refurbishment, and so on). The patch 94 may be used while the aircraft 122 is in service to rework areas of the aircraft 122 that may develop inconsistencies while in service, and the condition of the patch 94 may be checked as part of a periodic maintenance routine.

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 21, the aircraft 122 produced by exemplary method 120 may include an airframe 138 with a plurality of systems 140 and an interior 142. The patch 94 may be used to rework inconsistencies in the airframe 138. Examples of high-level systems 140 include one or more of a propulsion system 144, an electrical system 146, a hydraulic system 148, and an environmental system 150. Any number of other systems may be included. Although an aerospace example is shown, the principles of the disclosure may be applied to other industries, such as the marine and automotive industries.

Systems and methods embodied herein may be employed during any one or more of the stages of the production and service method 120. For example, components or subassemblies corresponding to production process 128 may be fabricated or manufactured in a manner similar to components or subassemblies produced while the aircraft 122 is in service. Also, one or more embodiments may be utilized during the production stages 128 and 130, for example, by substantially expediting assembly of or reducing the cost of an aircraft 122. Similarly, one or more of embodiments may be utilized while the aircraft 122 is in service, for example and without limitation, to maintenance and service 136.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of controlling the advance of a disbond in a composite laminate patch bonded to a structure and covering an inconsistent area, the method comprising:

overlying the inconsistent area of the structure with a first control region of the composite laminate patch;

controlling the advance of a disbond outwardly beyond the first control region via completely surrounding the first control region with a second control region in the composite laminate patch; and diffusing a fracture energy of the disbond as the disbond advances from the first control region to the second control region, via forming a separation zone, in the composite laminate patch, located between the first control region and the second control region.

2. The method of claim 1, further comprising:

providing the separation zone in the composite laminate patch with an interlaminar fracture toughness that is less than an interlaminar fracture toughness of the first control region.

3. A method of controlling the advance of a disbond in a composite laminate patch, covering an inconsistent area, bonded to a composite aircraft, the method comprising:

controlling the advance of a disbond in the composite laminate patch via forming a first control region in the composite laminate patch, overlying the inconsistent area of the aircraft;

controlling the advance of a disbond outwardly beyond the first control region via forming a second control region in the composite laminate patch completely surrounding the first control region;

providing the second control region with characteristics resulting in the second control region comprising an interlaminar fracture toughness greater than that of the first control region;

diffusing fracture energy of the disbond as the disbond advances from the first control region to the second control region via forming a first separation zone, in the composite laminate patch, between the first and second control regions;

providing the first separation zone with characteristics resulting in the first separation zone comprising an interlaminar fracture toughness less than that of the first control region;

controlling the advance of a disbond outwardly beyond the second control region via forming a third control region, in the composite laminate patch, completely surrounding the second control region;

providing the third control region with characteristics resulting in the third control region comprising an interlaminar fracture toughness greater than that of the second control region;

diffusing fracture energy of the disbond as the disbond advances from the second control region to the third control region via forming a second separation zone, in the composite laminate patch, between the second and third control regions;

providing the second separation zone with characteristics resulting in the second separation zone comprising an interlaminar fracture toughness less than that of the first control region;

diffusing fracture energy of the disbond as the disbond advances outwardly from the third control region via forming a third zone, in the composite laminate patch, completely surrounding the third control region; and providing the third zone with characteristics resulting in the third zone comprising an interlaminar fracture toughness less than that of the first control region.

* * * * *